3,269,880
HEAT RESISTANT BUTADIENE-ACRYLO-NITRILE PROPELLANTS
Martin Visnov, Philadelphia, Pa., and James H. Godsey, Wilmington, Del., assignors, by direct and mesne assignments, to the United States of America as represented by the Secretary of the Army
No Drawing. Filed Jan. 13, 1965, Ser. No. 425,360
10 Claims. (Cl. 149—2)

This invention relates to propellants and more particularly concerns improved heat resistant propellants for use in propellant actuated device cartridges and the like.

In the field of propellant actuated devices an urgent need exists for propellants capable of resisting temperatures up to at least about 350° F. for periods of at least several hours, of evolving non-corrosive combustion products when burned, and yet the propellant grains being readily capable of manufacture by extrusion by standard machinery into mono-perforated or multi-perforated gun-type grains. This need has become vitally urgent in recent years due to the need of such grains in the utilization by aircraft, missiles, interplanetary probes, and the like which require propellant actuated devices to encounter elevated temperatures from such sources as aerodynamic heating, proximity to heat producing devices or from sterilization processes.

In the past, thermal insulation or inferior heat-resistant compositions, or combinations of both, were used in an attempt to overcome the aforementioned problems. For example, the use of insulation adds unnecessary weight to the flying vehicle as well as taking up limited space facilities. Extrudable composite propellant compositions generally employed thermoplastic polymers which were capable of resisting elevated temperatures but suffered undesirable deformation above 300° F. Others employed perchlorate oxidizers or chlorine-containing polymers which yield corrosive combustion products to limit the propellant device to a single firing, thereby preventing any testing prior to its use, or multiple firings in devices designed for repeated use.

It is therefore a broad object of the invention to provide new, improved solid propellant compositions.

Another object of the invention is to provide propellant grains which are admirably resistant to heat and yet are readily and easily extrudable into varying geometries, while yielding no corrosive combustion products when burned.

Other and further objects of the invention will be apparent to those skilled in the art upon study of this disclosure.

Now in accordance with our present invention, a method has been discovered which permits our inventive compositions to achieve the aforementioned objects in a simple and facile manner using manufacturing equipment such as those conventionally used in the manufacture of smokeless powder. Moreover, in conjunction with this conventional equipment, the procedure of the present invention simply involves mixing, extruding, cutting, drying and curing with glazing, if desired, to produce the unique product of our invention.

More specifically, the present invention provides a method for the manufacture of granulated propellants having high heat resistance and comprises forming the uniform doughy mixture in a volatile solvent of about 84% of cyclotetramethylene tetranitramine (HMX) and about 15.8% of a binder, Hycar 1051, which is a copolymer of 60% butadiene and 40% acrylonitrile having an empirical formula of $C_{3.6}H_{4.8}N_{0.4}$, a product of B. F. Goodrich Co., and 0.2% Luperco ATC, a catalyst product of Wallace and Tiernan, Inc., comprising benzoyl peroxide and tricresyl phosphate, extruding and cutting the mixture into desired granules, drying the granules at elevated temperature and then finally curing them at a temperature above the boiling point of the solvent, resulting in cured propellant grains free of said solvent.

*Example 1*

High temperature resistant propellant was prepared using the following formulation:

| Ingredients | Weight Percent | Weight, grams |
|---|---|---|
| HMX | 84.0 | 840.0 |
| Hycar 1051 | 15.8 | 158.0 |
| Luperco ATC | 0.2 | 2.0 |
| Total | 100.0 | 1,000.0 |

The method of preparation was as follows:

The Hycar 1051 was placed in a Bramley mill, 10 grams of methyl ethyl ketone was added, and the mixture was mixed for about 5 minutes. Luperco ATC was then added, and the mixing was continued for an additional 5 minutes. Following this, the HMX was added in two increments with each increment being wet down with 45 grams of methyl ethyl ketone, utilizing a mixing cycle of 15 minutes for the addition of each increment. The mixture thus formed was mixed for an additional 60 minutes after which the mixture was removed and placed in a two-inch extrusion press. The mixture was then extruded through a 0.202 inch—0.015° (7 pin) die and was granulated to 2.02 cuts per inch on a small arms cutter. The granules (7 perforations) were then sent to a dry house and dried for 48 hours at a temperature of 131° F. After this, the granules were cured about 6 hours at a temperature of about 200° F. in a rotating sweetie barrel.

With reference to the foregoing preparation, the extrusion pressure was about 1000 p.s.i. No difficulty was encountered in granulating on a conventional small arms cutter. The properties of this propellant are shown in Table I.

TABLE I.—PROPERTIES OF HEAT RESISTANT PROPELLANT

Physical properties:
    Observed density (gm./cc.) _____ 1.59
    Granulation nominal (inches) _____ 0.202 x 0.015°
        (7) x 0.495
Observed heat of explosion
    (cal./gm.) _____ 840
Thermodynamic properties (calc.):
    Moles gas/gram propellant _____ 0.0522
    Flame temperature, $T_v$ (° K.) _____ 2311
    Impetus, F (ft.-lbs./lb.) _____ 335,000

With reference to the foregoing example and table, it will be seen that our granulated propellant obtained in accordance with the invention can be produced in a simple and facile manner and are possessed of good physical and thermodynamic properties. There now follows a showing of the thermal stability of this propellant in Table II.

TABLE II.—THERMAL STABILITY

| Temperature (° F.) | Exposure Time (hrs.) | Weight Loss (percent) |
|---|---|---|
| 300 | 5 | 0.26 |
| 310 | 5 | 0.30 |
| 320 | 5 | 0.35 |
| 330 | 5 | 0.42 |
| 340 | 5 | 0.55 |
| 350 | 5 | 0.82 |

The amount of individual ingredients in the propellant may be varied from that shown in Example I. For example, we have found that satisfactory heat-resistant propellants may be produced when the weight percent of HMX falls within the range of about 70.0 to 87.5; Hycar 1051, 12.3 to 29.6; and Luperco ATC, 0.2 to 0.4.

It should be noted that both specific impulse and impetus may be increased when HMX content is increased and would continue to do so until 100% is reached. This, however, would result in an explosive, rather than a heat-resistant propellant and by balancing explosiveness with safety, processing procedures and heat resistance, we have determined that optimum physical properties for our purposes are obtained when the formulation of Example I are employed.

As previously set forth, the propellants of this invention may be manufactured utilizing conventional smokeless powder equipment and in granule or grain size and with perforations similar thereto. The individual grains may have an outer diameter as small as about 0.05 inch, or, if desired, an outer diameter of about 0.6 inch. Perforations may vary from a central monoperforation in smaller diameter grains to generally 7 or 19 perforations in the larger diameter grains. The limitation of outer diameter is one of solvent removal. Thus, substantially the same parameters for grain size and web exist as between this invention and the conventional solvent process for the manufacture of smokeless powder, since it has long been recognized that in drying conventional propellants with large webs, grain porosity usually results, and the drying time becomes inordinately long.

The utility and advantages for our invention are to be found in widespread applications which require the ability of the propellant grains to be subjected to elevated temperatures to about 350° F. Its principal advantage however resides in the fact that not only do our propellant grains admirably resist elevated temperatures as aforementioned and may be solvent extruded easily and economically using standard equipment, but that they evolve no corrosive combustion gases as do other propellants which employ perchlorate oxidizers or chlorine-containing polymers as fuels.

Since modifications of the invention will be apparent to those skilled in the art, it is intended that the scope of the invention be limited only by the appended claims.

We claim:

1. A method for manufacturing granulated propellants capable of withstanding elevated temperatures for extended periods comprising the steps of
    mixing about 12.3 to 29.6% of a copolymer binder comprising about 60% butadiene and 40% acrylonitrile with solvent in a mixer,
    mixing thereinto about 0.2 to 0.4% of a catalyst comprising benzoyl peroxide and tricresyl phosphate,
    adding thereinto about 70.0 to 87.5% of HMX in a plurality of increments in the presence of a volatile solvent therefor to form a mixture,
    solvent extruding said mixture,
    cutting the extruded propellant mixture into granules of desired geometry,
    drying the propellant granules at elevated temperature, and
    curing the propellant granules at a temperature above the boiling point of the volatile solvent.

2. The method of claim 1 wherein said cured propellant granule is devoid of corrosive products upon combustion.

3. The method of claim 1 wherein said solvent extrusion step is characterized by said propellant having a generally central mono-perforation therethrough.

4. The method of claim 1 wherein said solvent extrusion step is characterized by said propellant having a plurality of spaced perforations therethrough.

5. The method of claim 1 further characterized by said extrusion step resulting in a doughy strand having an outer diameter of about 0.05 inch to about 0.6 inch.

6. The method of claim 5 wherein said 0.05 inch strand has a central mono-perforation therethrough.

7. The method of claim 5 further characterized by said 0.6 inch strand having as many as 19 spaced perforations therethrough.

8. A method for manufacturing granulated propellants capable of withstanding elevated temperatures for extended periods comprising the steps of
    mixing about 15.8% of a co-polymer binder comprising about 60% butadiene and 40% acrylonitrile with a volatile solvent in a mixer,
    mixing thereinto about 0.2% of a catalyst comprising benzoyl peroxide and tricresyl phosphate,
    adding thereinto about 84% of HMX in a plurality of increments in the presence of a volatile solvent therefor to form a mixture,
    solvent extruding said mixture,
    cutting the extruded propellant mixture into granules of desired geometry,
    drying the propellant granules at elevated temperature, and
    curing the propellant granules at a temperature above the boiling point of the volatile solvent.

9. A solid propellant composition consisting essentially of cyclotetramethylene tetranitramine in a range of between about 70 to 87.5 weight percent, a co-polymer binder in a range of between about 12.3 to 29.6 weight percent consisting of about 60 weight percent butadiene and 40% acrylonitrile and a catalyst comprising a combination of benzoyl peroxide and tricresyl phosphate in the neighborhood of about 0.2 to 0.4 weight percent, said solid propellant composition being devoid of compositions yielding harmful corrosive combustion products.

10. A solid propellant composition consisting essentially of about 84 weight percent cycloetramethylene tetranitramine, about 15.8 weight percent of a co-polymer binder comprising 60% butadiene and 40% acrylonitrile and about 0.2 weight percent of a catalyst comprising benzoyl peroxide and tricresyl phosphate, said solid propellant composition being devoid of compositions yielding harmful corrosive combustion products.

References Cited by the Examiner

UNITED STATES PATENTS 3,152,027   10/1964   Godsey _____ 149—19 X
3,154,449   10/1964   Ives _____ 149—19

BENJAMIN R. PADGETT, *Primary Examiner.*